United States Patent [19]

Moss

[11] Patent Number: 5,007,485
[45] Date of Patent: Apr. 16, 1991

[54] EARTH CRUST BREAKER

[76] Inventor: Robert J. Moss, Rte. #1, Box 8G, Hoxie, Kans. 67740

[21] Appl. No.: 421,666

[22] Filed: Oct. 16, 1989

[51] Int. Cl.$^5$ .............................................. A01B 31/00
[52] U.S. Cl. .................................... 172/500; 172/462; 172/768; 172/612
[58] Field of Search .................... 172/189–191, 172/336, 500, 501, 502, 505, 449, 612, 687, 688, 684.5, 689, 768; 24/300

[56] References Cited

U.S. PATENT DOCUMENTS

| | | | |
|---|---|---|---|
| 473,041 | 4/1892 | Wilfert | 172/687 |
| 499,415 | 6/1893 | Cardinal et al. | 172/191 |
| 612,818 | 10/1898 | Brown | 172/191 |
| 910,752 | 1/1909 | Warner | 172/336 |
| 1,784,655 | 12/1930 | Budd | 172/687 |
| 2,327,198 | 8/1943 | Lingle | 172/688 |
| 2,591,028 | 4/1952 | Udy | 172/502 X |
| 2,963,098 | 12/1960 | Kesselring | 172/502 X |
| 4,769,875 | 9/1988 | Hartman | 24/300 |
| 4,846,084 | 7/1989 | Sigle | 172/624.5 X |

FOREIGN PATENT DOCUMENTS

| | | | |
|---|---|---|---|
| 1402972 | 5/1965 | France | 172/449 |
| 1172461 | 6/1964 | German Democratic Rep. | 172/502 |

*Primary Examiner*—Dennis L. Taylor
*Assistant Examiner*—Jeffrey L. Thompson
*Attorney, Agent, or Firm*—Richard L. Miller

[57] ABSTRACT

An earth crust breaker drawn by a tool bar on a tractor is provided and consists of an elongated U-shaped frame having an angularly upwardly extending front end attached to the bottom of a vertical member of the tool bar. A post extends vertically from each side of the frame to the free end of a horizontal member of the tool bar. A plurality of specifically placed knife blades extend from the bottom of the frame to penetrate the ground and make slices into the crust thereby chopping it up.

4 Claims, 1 Drawing Sheet

EARTH CRUST BREAKER

BACKGROUND OF THE INVENTION

The instant invention relates generally to agricultural implements and more specifically it relates to an earth crust breaker.

Numerous agricultural implements have been provided in prior art that are adapted to be pulled by tractors to cultivate or break up the earth's surface in preparation for planting and the like. For example, U.S. Pat. Nos. 2,361,605 to Cross; 3,077,231 to Hamilton and 3,464,498 to Hornung all are illustrative of such prior art. While these units may be suitable for the particular purpose to which they address, they would not be as suitable for the purpose of the present invention as hereafter described.

SUMMARY OF THE INVENTION

A primary object of the present invention is to provide an earth crust breaker that will overcome the shortcomings of the prior art devices.

Another object is to provide an earth crust breaker having a plurality of knife blades thereon for penetrating the ground and making slices into the crust thereby chopping it up, and making it easier for newly planted seedlings to break through the grounds surface.

An additional object is to provide provide an earth crust breaker that will flex and adjust to the unevenness of the ground and be adjustably spring biased to obtain the proper amount of pressure to different kinds of crust encountered.

A further object is to provide an earth crust breaker that is simple and easy to use.

A still further object is to provide an earth crust breaker that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
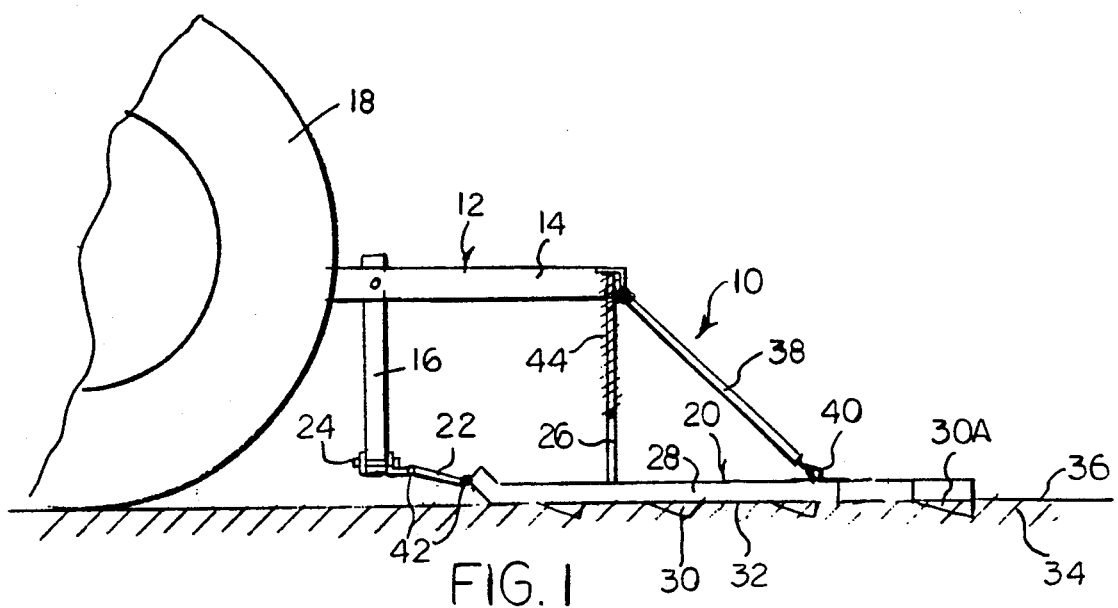
FIG. 1 is a diagrammatic side view of the instant invention being pulled by a tractor.
Figure 2:
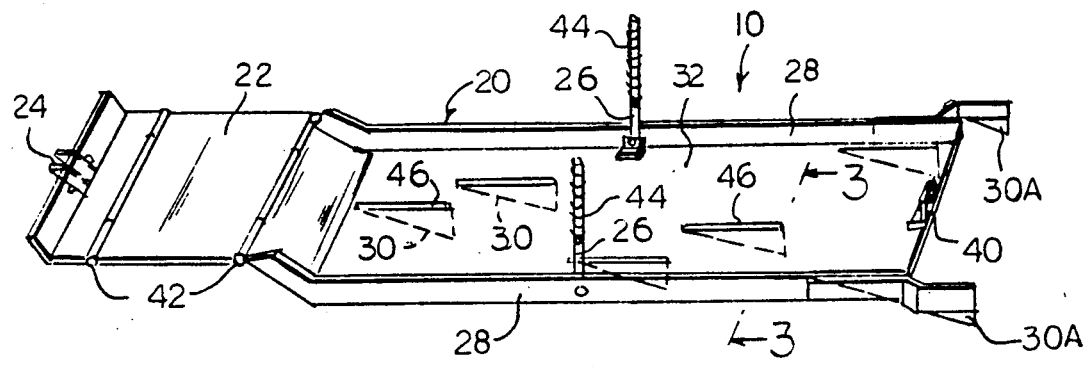
FIG. 2 is a diagrammatic perspective view of the instant invention per se.

Turning now descriptively to the drawings, in which like reference characters denote like elements throughout the several views, FIGS. 1 and 2 illustrate an earth crust breaker 10 drawn by a tool bar 12 having a horizontal member 14 and a vertical member 16 on a tractor 18. The earth crust breaker 10 contains an elongated U-shaped frame 20 having an angularly upwardly extending front end 22 attached to the bottom of the vertical member 16 of the tool bar 12 by coupling 24. A post 26 extends from each side 28 of the frame 20 to the free end of the horizontal member 14 of the tool bar 12. A plurality of specifically placed knife blades 30 extend from the bottom 32 of the frame 20 to penetrate the ground 34 and make slices into the crust 36 thereby chopping it up.

A flexible rubber tarpaulin strap 38 extends diagonally from the free end of the horizontal member 14 to the rear end 40 of the frame 20 to hold up the rear end and prevent the frame from flexing down when it is out of the ground 34 and turning around.

The front end 22 of the frame includes a double hinge which allows the frame 20 to flex and adjust to the unevenness of the ground 34 and also helps shed any trash it may encounter.

A compression spring 44 is adjustably carried on each of the posts 26 to bias the frame 20 to obtain a proper amount of pressure so that the knife blades 30 can penetrate different kinds of crusts 36 encountered.

Figure 3:
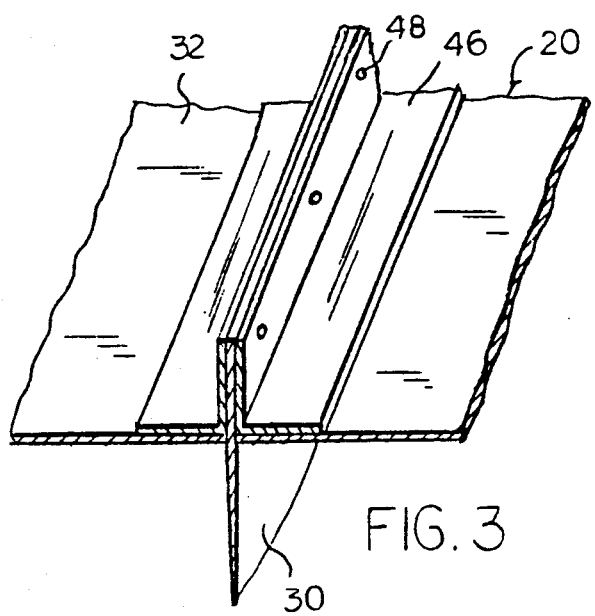
FIG. 3 is an enlarged diagrammatic cross sectional perspective view taken along line 3—3 in FIG. 2 showing the mounting of a typical blade therein.

As best shown in FIG. 3, each knife blade 30 extends through and is removably secured to the bottom 32 of the frame 20 by a bracket 46 and a plurality of bolts 48 so that the knife blades 30 can be replaced when worn and damaged. A knife blade 30A can also be removably attached to each side 28 of the frame to increase the swath covered by the earth crust breaker 10.

In use and operation the earth crust breaker 10 is attached by coupling 24, posts 26 and rubber tarpaulin strap 38 to the tool bar 12 so that the tractor 18 can pull the earth crust breaker 10 over the ground 34 allowing the knife blades 30 and 30A to break up the crust 36. The depth of the cuts made by the knives are normally not deep enough to damage seedlings which are germinating generally well below the ground surface at the time cuts are created.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An earth crust breaker drawn by a tool bar having a horizontal member and a vertical member on a tractor comprising:
   (a) an elongated U-shaped frame having an angular upwardly extending front end attached to the bottom of the vertical member of the tool bar;
   (b) a pair of spaced apart posts, each extending vertically from one side of said frame to the free end of the horizontal member of the tool bar wherein a flexible rubber tarpaulin strap extending diagonally from the free end of the horizontal member to the rear end of said frame to hold up the rear end and prevent said frame from flexing down when it is out of the ground and turning around;
   (c) a plurality of specifically placed knife blades extending from the bottom of said frame and fixed movably thereon to penetrate the ground and make slices into the crust thereby chopping it up; and
   (d) a double hinge provided on the front end of said frame which allows said frame to flex and adjust to the unevenness of the ground and also helps shed any trash the frame encounters.

2. An earth crust breaker as recited in claim 1, further including a pair of springs, each adjustably carried on one of said posts to bias said frame to obtain a proper amount of pressure so that said knife blades can penetrate different kinds of crusts encountered.

3. An earth crust breaker drawn by a tool bar having a horizontal member and a vertical member on a tractor comprising:
   (a) an elongated U-shaped frame having an angular upwardly extending front end attached to the bottom of the vertical member of the tool bar;
   (b) a pair of spaced apart posts, each extending vertically from one side of said frame to the free end of the horizontal member of the tool bar; and
   (c) said frame having a panel-form bottom with a lower, smooth ground engaging surface and provided with a plurality of slots at pre-selected locations, said slots extending in the direction of drawn movement, knife blades releasably secured to an upper surface of the bottom by brackets so as to extend immovably through the slots protruding below the lower surface of the bottom to penetrate the ground and make slices into the crust thereby chopping it up, further including a pair of springs, each adjustably carried on one of said posts to bias said frame to obtain a proper amount of pressure so that said knife blades can penetrate different kinds of crusts encountered and further comprising a flexible rubber tarpaulin strap extending diagonally from the free end of the horizontal member to the rear end of said frame to hold up the rear end and prevent said frame from flexing down when it is out of the ground and turning around.

4. An earth crust breaker as recited in claim 3, wherein the front end of said frame includes a double hinge which allows said frame to flex and adjust to the unevenness of the ground and also helps shed any trash it may encounter.

* * * * *